Nov. 7, 1967

J. A. GAYLORD 3,351,082

DISCONNECT DEVICE FOR SURVIVAL KITS WITH SAFETY DEVICES

Filed Jan. 28, 1964

INVENTOR.
JOHN A. GAYLORD
BY George B. White
ATTORNEY

Nov. 7, 1967  J. A. GAYLORD  3,351,082
DISCONNECT DEVICE FOR SURVIVAL KITS WITH SAFETY DEVICES
Filed Jan. 28, 1964  4 Sheets-Sheet 2
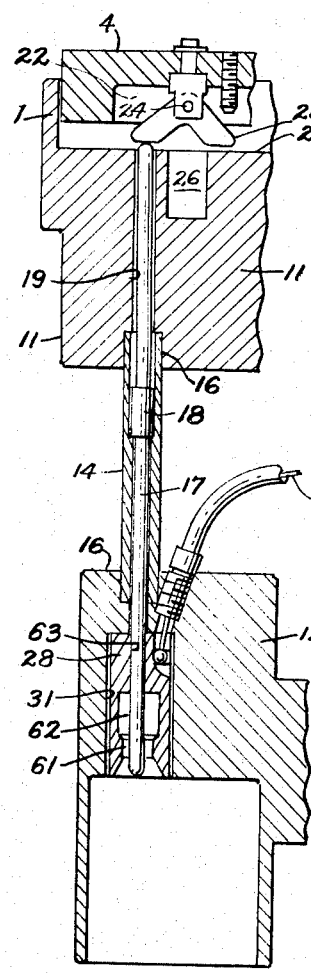
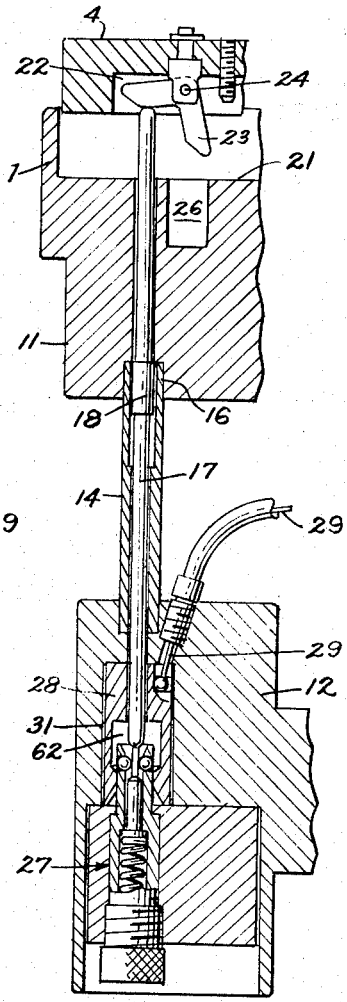
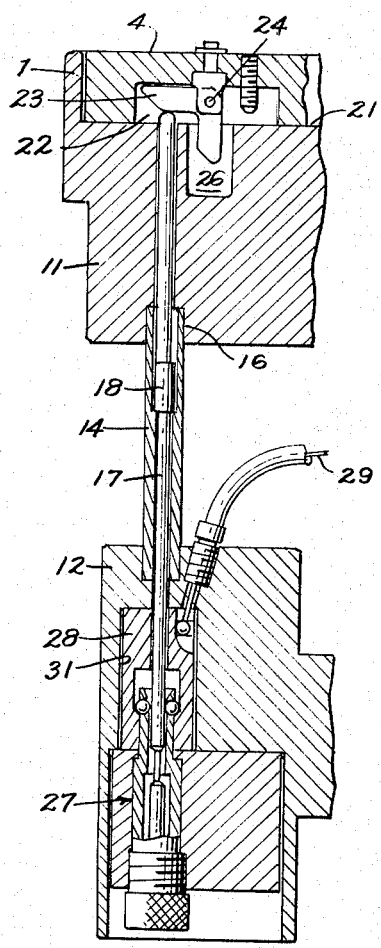
INVENTOR.
JOHN A. GAYLORD
BY George B. White
ATTORNEY

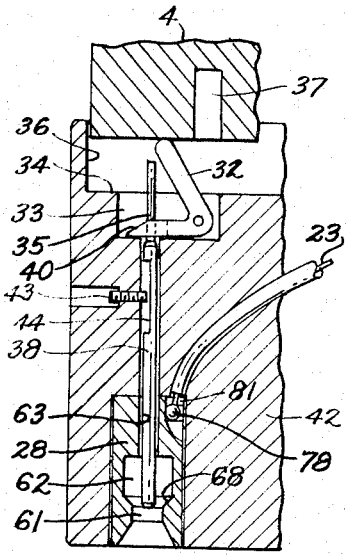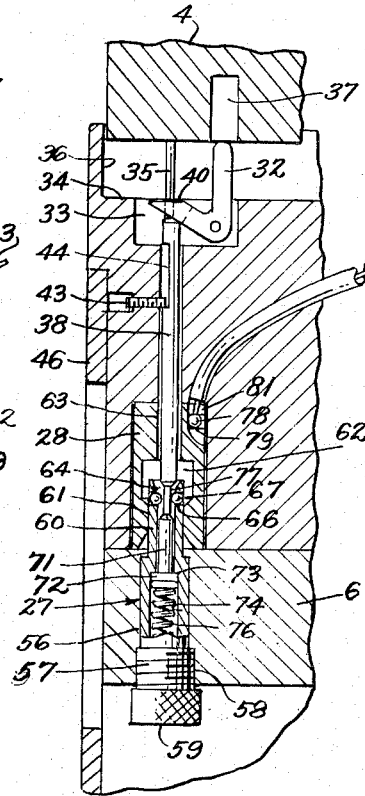

Nov. 7, 1967  J. A. GAYLORD  3,351,082
DISCONNECT DEVICE FOR SURVIVAL KITS WITH SAFETY DEVICES
Filed Jan. 28, 1964  4 Sheets-Sheet 4
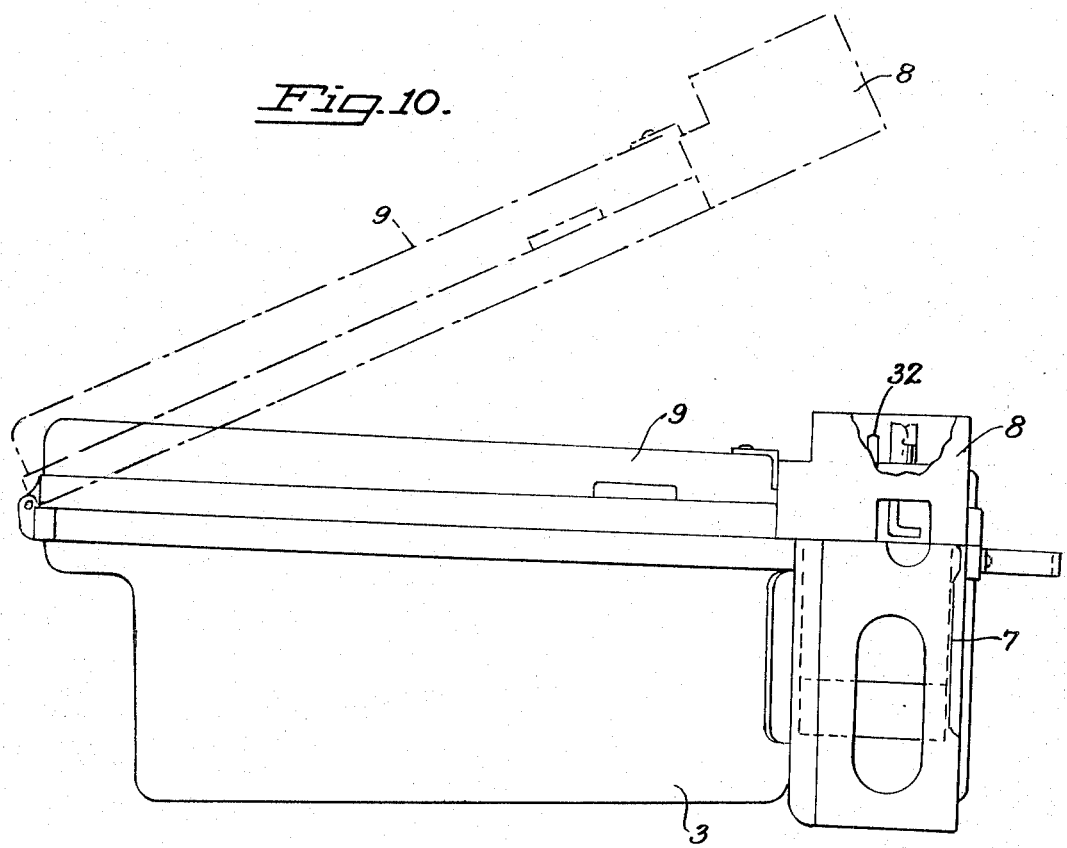
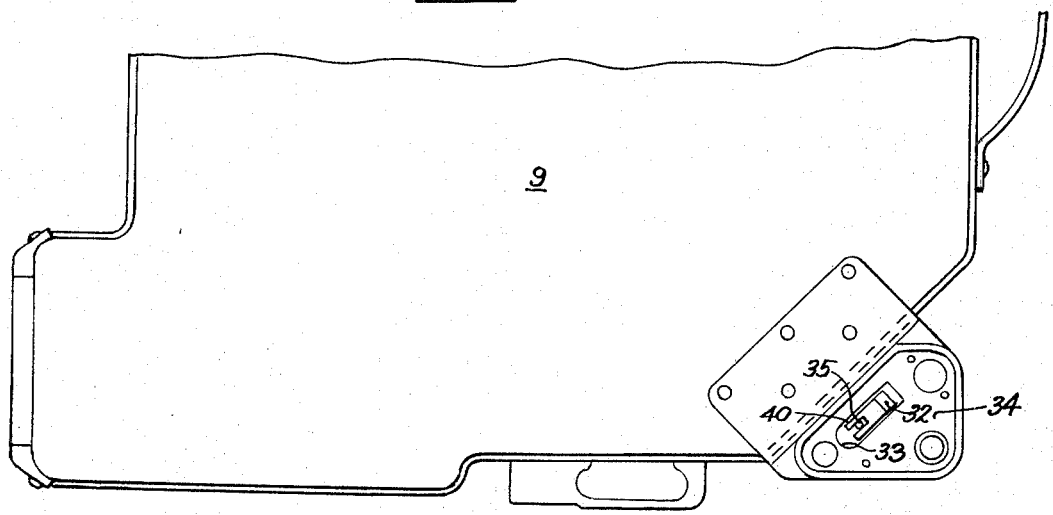
INVENTOR.
JOHN A. GAYLORD
BY
George B. White
ATTORNEY

United States Patent Office 3,351,082
Patented Nov. 7, 1967

3,351,082
DISCONNECT DEVICE FOR SURVIVAL KITS WITH SAFETY DEVICES
John A. Gaylord, San Rafael, Calif., assignor to H. Koch & Sons, Corte Madera, Calif., a corporation of California
Filed Jan. 28, 1964, Ser. No. 340,714
19 Claims. (Cl. 137—315)

This invention relates to a disconnect device for survival kits with safety devices.

In general this invention relates to disconnect devices of the general type shown in my copending application, Ser. No. 186,579 filed Mar. 22, 1962 now Letters Patent No. 3,185,148 issued on May 25, 1965; such disconnect devices are used for aerial survival kits of the type described in my United States Letters Patent No. 2,992,798, issued on July 18, 1961 and No. 2,992,567, issued on July 18, 1961.

In such survival kits there are various devices and supplies provided for the survival of aircraft personnel when ejected or otherwise escaping from an aircraft for parachute descent. In such survival kits usually, as described in my said patents, the survival kit fits into the seat of the aircraft personnel so that it may be ejected automatically with the aircrcaft personnel when parachute descent is necessary.

This disconnect device is primarily concerned with the electrical contacts and the alternation of the oxygen supply from the regular oxygen source in the aircraft to the emergency oxygen supply in the kit.

An object of the invention is to provide a disconnect device for survival kits with separate sockets for a plug for ship to kit connection at the bottom and for a plug for kit to man connection at the top, and with means to prevent the plugging in of the kit to man connection unless and until the ship to kit connection is completed; the terms ship to kit connection and kit to man connection are used to denote respectively the connections between devices in the aircraft and the kit and between the kit and devices borne by the aircraft personnel particularly with respect to electrical and oxygen supply.

Another object of the invention is to provide a safety device to obstruct the plug of the kit to man connection, the obstruction being rendered inoperative by the insertion of the other plug for ship to kit connection, thereby assuring that whenever the aircraft personnel inserts the kit to man plug in the disconnect device there is established electrical and oxygen supply connections to the respective devices in the aircraft.

The above objects of the invention solve the grave problem which arose by aircraft personnel mistakenly plugging in the kit to man connection and discovering too late that the electrical and oxygen connections from the aircraft were not completed. In other respects for the general quick release of the disconnect device the type of manipulating device described in Patent No. 3,038,472 issued on June 12, 1962, may be utilized.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 3 is a sectional view of the disconnect device showing all plugs disconnected.

FIG. 4 is a sectional view of the disconnect device showing the kit to ship plug connected and kit to man plug ready for insertion.

FIG. 5 is a sectional view of the disconnect device with the top and bottom plugs attached.

FIG. 6 is a sectional view of a modified form of the disconnect device with the obstructing dog pivoted in the receptacle or socket, and showing both plugs detached.

FIG. 7 is a sectional view of the modified form of FIG. 6 with the ship to kit plug attached and the kit to man plug ready for insertion.

FIG. 8 is a sectional view of another modified form of the disconnect device showing both plugs attached.

FIG. 9 is a perspective detail view on an enlarged scale of the connection between the obstructing dog of FIGS. 6 and 8 with the push rod.

FIG. 10 is a somewhat diagrammatic view of a modified form of the kit showing the modified connecting of a part of the disconnect device of FIG. 8 to the lid of the kit.

FIG. 11 is a top plan view of the lid of the kit showing the attachment of a part of the modified form of the FIG. 8 to the lid.

Figure 1:
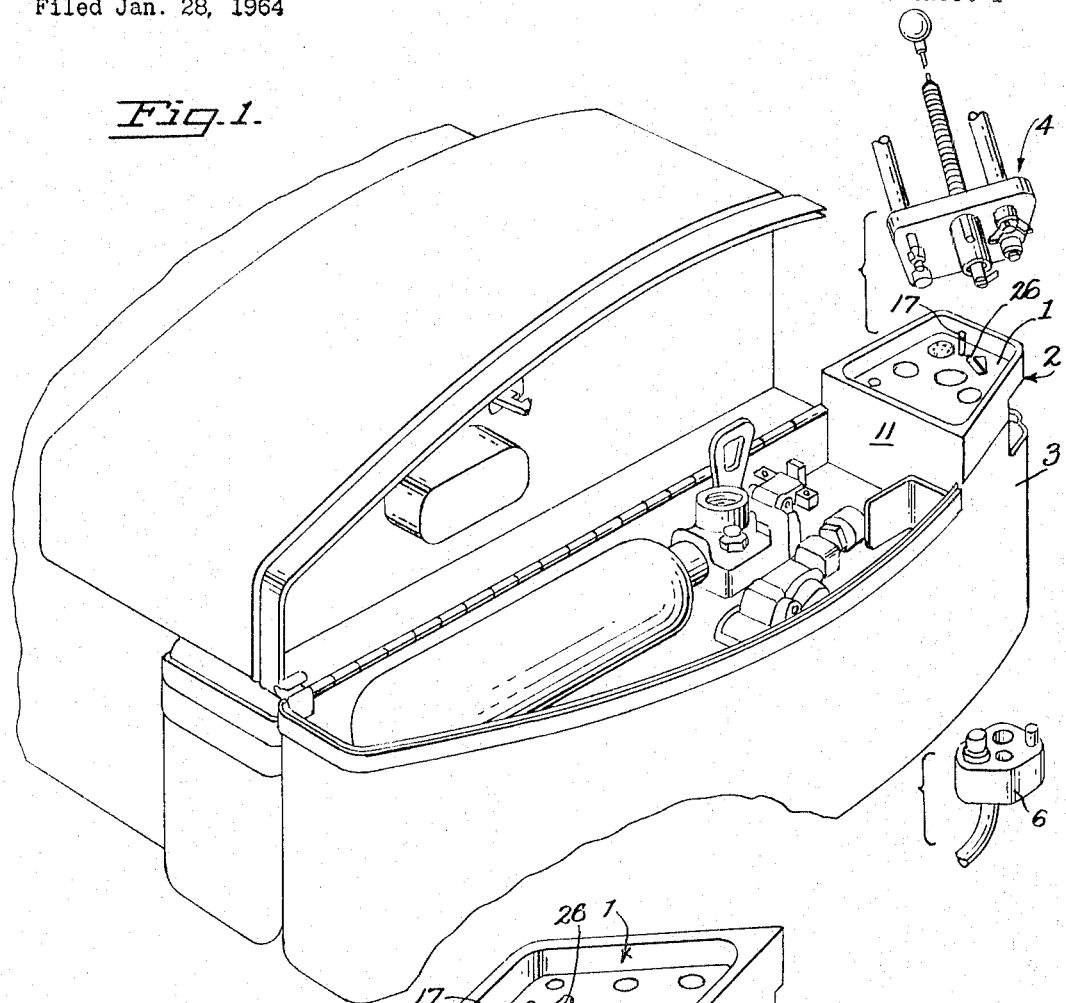
FIG. 1 is a perspective view of an end of a survival kit showing one form of the connecting socket in a corner of the kit.
Figure 2:
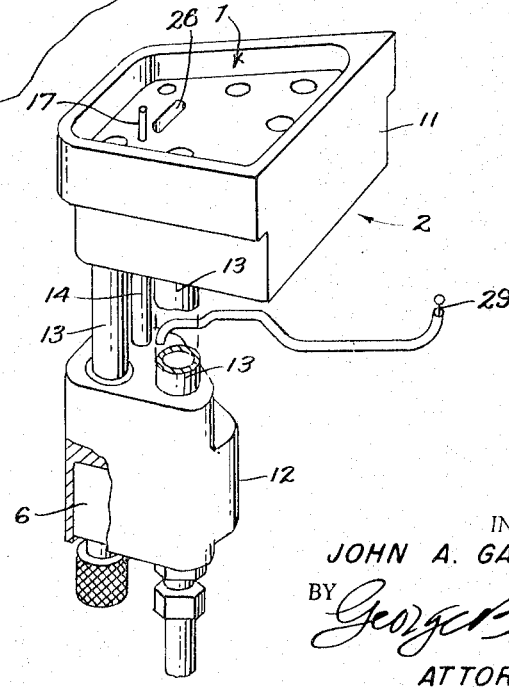
FIG. 2 is a perspective view of the disconnect device to be secured in the corner of the kit.

In FIG. 1 there is shown the form wherein the receptacle portion of the disconnect device is mounted inside of a corner of the kit itself. The top socket 1 is formed in a body 2 secured in a suitable cavity in a corner of a rigid kit casing 3. The kit to man plug 4 is of the same type as shown in said Patent No. 3,038,472, and the socket 1 is provided substantially with the same type of openings and passages as in said patent for establishing the electrical and oxygen connections between the kit and the devices carried by the aircraft personnel. A ship to kit plug 6 is insertable in the bottom of the disconnect device as hereinafter described.

In FIGS. 10 and 11 is shown a modified form wherein a hollow shield 7 is fixedly secured to the outside of the kit body 3, and a socket part 8 of the disconnect body is fixedly secured to the rigid lid 9 of the kit so that when the lid 9 is closed the socket 8 assumes an operative position on the shield 7.

In FIGS. 2, 3, 4 and 5 is shown a more detailed arrangement of the disconnect device utilized in the arrangement of FIG. 1. The body 2 of the receptacle includes a top body section 11 and a bottom body section 12 spaced from one another so that the top body section 11 is at the top of the kit casing 3 as shown in FIG. 1 and the bottom body section 12 is recessed into the bottom of the casing 3. The body sections 11 and 12 are connected by suitable tubes 13. A push rod holder tube 14 is held in suitable countersunk recesses 16 in the respective body sections 11 and 12. A push rod 17 extends through the tube 14. A collar 18 on the push rod 17 guides the push rod in the tube 14 and prevents the falling out of the rod 17 by abutting against the shoulders of the respective recesses 16. The push rod 17 slidably extends through a hole 19 upwardly through the upper body section 11 so as to project above the socket surface 21 as shown in FIG. 4.

In a recess slot 22 in the bottom of the kit to man plug 4 is pivoted a bell crank dog 23 on a transverse pivot 24 through its apex so that normally the arms of the dog 23 are balanced and hang in an inverted V shape in the manner shown in FIG. 3. When the kit to man plug 4 is pushed into the top socket 1, and if the ship to kit plug 6 is not yet inserted, then the dog 23 pushes the rod 17 downwardly without appreciable resistance and the ends of the balanced arms of the bell crank dog 23 abut against the top socket surface 21 and prevent the full insertion or connection of the kit to man plug 4. When the ship to kit plug 6 is inserted, then it holds the push rod 17 against downward movement, in a manner to be hereinafter described, and when the adjacent arm of the bell crank dog 23 engages the top of the push rod 17 it will turn the bell crank dog 23 as shown in FIG. 4 so that the engaged arm of the dog 23 is in a generally horizontal position and the other arm of the dog 23 is in registry with and enters into a pocket 26 in the top body section 11, as shown in FIG. 5, thereby to render the obstructing dog 23 ineffective and permit the engagement of the kit to man plug 4 in the socket 1.

The push rod 17 is held against downward movement by a releasable plunger device 27 provided with quick release ball locking means operated by the push rod 17 to interlock the plunger device 27 with a pulling block 28. The pulling block 28 has a pull line 29 suitably attached thereto and extended into the kit for automatically actuating the emergency oxygen supply in the kit in the usual manner whenever the pull block 28 is pulled out of its socket 31 in a manner to be hereinafter described.

In the modified form shown in FIGS. 6 and 7 the bell crank dog 32 is pivoted in a pocket 33 in the bottom 34 of the receptacle recess 36 so that one arm of the bell crank dog 32 rests on the bottom of the pocket 33 and the other arm of the dog 32 projects upwardly above the bottom 34 into an obstructing position. A pocket 37 is formed in the bottom of the kit to man plug 4 so located that when the bell crank dog 32 is turned to a position to have its upper arm in a vertical position as shown in FIG. 7, then said vertical bell crank arm is in registry with the pocket 37 and enters thereinto so as to permit the kit to man plug 4 to be fully inserted into the receptacle recess 36.

The bell crank dog 32 is pushed from the position shown in FIG. 6 into the position shown in FIG. 7 by a push rod 38, a shouldered end 35 of which engages a forked end 40 of the weighted arm 41 of the bell crank 32 in the obstructing position shown in FIG. 6. The push rod 38 is concealed in the solid body 42 of this disconnect device. A limit pin 43 extended from the body 42 into an elongated slot 44 on a side of the push rod 38 limits the stroke of movement of the push rod 38 and prevents its falling out of the disconnect device in either direction. The push rod 38 is pushed up into the position shown in FIG. 7 when the ship to kit plug 6 is inserted into the bottom socket 45 of the receptacle holder casing or shield 46 similar to the shield 7.

The modified form shown in FIGS. 8, 10 and 11 operates in the same manner as the other forms. The ship to kit plug 6 in this form is inserted into the shield 7 after the lid 9 is closed. In that position the ship to kit plug 6 is pushed up into the shield 7. Through a side slot 48 of the shield 7 a finger can be inserted to push the plug 6 into engagement with the bottom of the receptacle body 49.

In all the forms of the invention the plunger device 27 in the ship to kit plug 6 includes a tubular casing 56 which has a threaded neck 57 fitting into a threaded pocket 58 in the plug 6. A head 59 is suitably knurled or slotted for screwing the unit into the plug 6 in axial registry with the pull block 28. A reduced end 60 of the tubular casing 56 slidably fits into an entrance hole 61 of the pulling block 28 and projects into an enlarged chamber 62. The push rod 17, or 38, as the case may be, slidably fits through a reduced hole 63 leading from the chamber 62 through the top of the pulling block 28. Thus in the assembled position as shown in FIGS. 4, 5 and 7 the push rod 17 extends through the hole 63 and the chamber 62 in axial alignment with the entrance hole 61 so that the push rod 17 can enter into an axial passage 64 of the tubular end 60. In the wall of the tubular end 60 and near its upper end are a plurality of transverse holes 66 to accommodate balls 67 respectively. The ends of the holes 66 are peened sufficiently to prevent the falling out of the balls 67. The balls 67 are of greater diameter than the length of the respective holes 66. The balls 67 coacting with the bottom shoulder 68 of the chamber 62 lock the tubular casing 56 in the inserted position until the push rod 17 is withdrawn from the reduced end 60. The pushing of the push rod 17 or 38 upwardly hold the push rod in operative position relatively to the dog 23 or 32. In the form shown in FIGS. 6 and 7 the upward pushing of the push rod 38 turns the bell crank dog 32 from the position shown in FIG. 6 into the position shown in FIG. 7 and the kit to man plug 4 presses the push rod 38 into the plunger end 60. In the form shown in FIG. 4 the push rod 17, when pushed up by the plunger device 27, projects to about the top of the top socket 1 to engage and turn the dog 23 to the position shown in FIG. 5 as the kit to man plug 4 is inserted in place.

The pushing up of the push rod 17 or 38 is accomplished by a plunger 71 reciprocable in the axial passage 64. A head 72 on the lower end of the plunger 71 is pressed against a shoulder 73 in an enlarged recess 74 of the casing 56 by a coil spring 76 so that a reduced plunger end 77 extends between the balls 67 and to the upper end of the axial passage 64. Thus when the ship to kit plug 6 is inserted, the plunger end 77 abuts against the end of the push rod 17 or 38 and pushes it up into the positions respectively shown in FIG. 4 and FIG. 7. When the kit to man plug 4 is inserted it pushes the push rod down into the axial passage 64 and between the balls 67, thereby locks the plunger device 27 and the ship to kit plug 6 in position.

The pull line 29 has a catch ball 78 on its end insertable laterally into a socket 79 with a narrow slot 81 to accommodate the line 29. The catch ball 78 is confined in place by the adjacent wall of the pull block 28. The pull line 29 is suitably connected to a device or valve not shown, to open the emergency oxygen supply from the kit to the device worn by aircraft personnel when the pull line 29 is pulled. Whenever the person wearing the kit is ejected or jumps from the aircraft the disconnect device is pulled off the ship to kit plug 6, which latter pulls the pull block 28 and the pull line 29 until the balls 67 clear the end of the push rod 18 or 38, whereupon the balls 67 are released and the reduced neck 60 of the plunger casing 56 is pulled out of the entrance hole 61 for complete separation of the kit from the ship.

The operation of the disconnect device in all of the herein described forms is substantially the same, except that in the embodiment shown in FIGS. 4, 10 and 11 the lid 9 must be closed on the kit 3 in order to bring the kit to man socket 8 in position. If by mistake the kit to man plug 4 is pushed into the kit to man socket when the kit is not connected to the ship by the ship to kit plug 6, then the dogs 23 or 32 respectively push the push rod 18 or 38 down and remain in obstructing positions as shown respectively in FIG. 1 and FIG. 4. When the ship to kit plug 6 is inserted it pushes up the push rod 18 or 38 and turns the respective dogs 23 or 32 into registry with the respective pockets 26 or 37 thereby to permit the connection of the kit to man plug 4. If the person wearing the kit wants to disconnect the kit, he first pulls out the kit to man plug 4, whereupon the push rod 18 or 38 is pushed up and locking balls 67 are released. Thereupon he pulls out the ship to kit plug 6, without operating the emergency oxygen valve. When the person wearing the kit is ejected or jumps in an emergency, then the disconnect device is pulled off the ship to kit plug 6 and during the initial separation it pulls the pull line 29 to operate the emergency oxygen valve in the kit, as heretofore described.

I claim:
1. In a disconnect device on survival kits for detachable connections for supplies and devices for oxygen, air and electricity from ship to kit and from kit to person,
  (a) a connector body mounted on the kit,
  (b) a kit to man socket on said body,
  (c) a ship to kit socket on said body spaced from said kit to man socket,
  (d) transmission means in said body between said sockets to conduct said oxygen, air and electricity respectively from one socket to the other,
  (e) a kit to man plug fitting into said kit to man socket,
  (f) conducting means on said kit to man plug to conduct said oxygen, air and electricity from said plug to devices worn by a person, said kit to man plug fitting the respective transmission means in said body at said ship to kit socket,
  (g) a ship to kit plug fitting into said ship to kit socket,
  (h) conducting means on said ship to kit plug connectable to supplies and devices for oxygen, air and electricity, in said kit respectively, said ship to kit plug fitting the respective transmission means in said body at said ship to kit socket,
  (i) obstructing means between said kit to man socket and said kit to man plug normally to obstruct the insertion of said kit to man plug into said kit to man socket,
    and means extending from one socket to the other actuated by the insertion of the ship to kit plug for coacting with said obstructing means to permit insertion of said kit to man plug into said kit to man socket wherever said ship to kit plug is inserted within the ship to kit socket.

2. In a disconnect device the elements defined in claim 1, and
  (k) an actuating pull line for a device in the kit extended from said kit into said body
  (l) an element interconnected between said ship to kit plug and said line to pull said line during the initial relative withdrawal movement of said ship to kit plug from said ship to kit socket.

3. In a disconnect device the elements defined in claim 1, and said obstructing means including
  (k) an abutment member pivoted on said kit to man plug normally in abutting relation to said kit to man socket
  (l) said actuated means being an abutment element movable relative to said body and engageable with said abutment member for turning said abutment member from said abutting relation to a non-abutting position,
  (m) and means on said ship to kit plug to engage and shift said abutment element for turning said abutment member to said non-abutting position.

4. In a disconnect device the elements defined in claim 1, and said obstructing means and said actuated means including,
  (k) a dog pivotally suspended from said kit to man plug normally to abut said kit to man socket thereby to obstruct insertion of said kit to man plug
  (l) a push rod movable through said body
  (m) a pusher on said ship to kit plug engageable with said push rod when said ship to kit plug is inserted into said ship to kit socket thereby to push said push rod into abutting relation to said dog for turning said dog into non-obstructing position.

5. In a disconnect device the elements defined in claim 1, and said obstructing means and said actuated means including,
  (k) a dog pivotally suspended from said kit to man plug normally to abut said kit to man socket thereby to obstruct insertion of said kit to man plug
  (l) said kit to man socket having a pocket therein for receiving said dog in out of obstructing position, said dog normally straddling said pocket to abut the surface adjacent said pocket
  (m) a push rod movable through said body in registry with said dog
  (n) a pusher on said ship to kit plug engageable with said push rod when said ship to kit plug is inserted into said ship to kit socket for pushing said push rod to turn said dog into registry with said socket.

6. In a disconnect device, the elements defined in claim 1, and said obstructing means and said actuated means including,
  (k) a dog pivoted in said kit to man socket normally projecting to obstruct insertion of said kit to man plug
  (l) said kit to man plug having a pocket therein for receiving said dog to permit insertion of said kit to man plug, said dog being normally out of registry with said pocket
  (m) a push rod movable through said body and abutting said dog
  (n) a pusher in said ship to kit plug engageable with said push rod when said ship to kit plug is inserted in said ship to kit socket, thereby to push said push rod for turning said dog into registry with said pocket.

7. In a disconnect device as defined in claim 1, and said obstructing means and actuated means including
  (k) coacting dog and pocket on said kit to man plug and kit to man socket normally out of registry to obstruct insertion of said kit to man plug
  (l) a dog moving member for turning said dog into registry with said pocket to permit insertion of said kit to man plug
  (m) means on said ship to kit plug engageable with said dog moving member to operate said dog moving member whenever said ship to kit plug is inserted into said ship to kit socket thereby to register said dog with said pocket.

8. In a disconnect device as defined in claim 1, and
  (k) said kit including a rigid case
  (l) a rigid lid fitting over said case
  (m) said connector body being mounted inside of said case so as to expose said kit to man socket at the top of the case and said ship to kit socket at the bottom of said case.

9. In a disconnect device as defined in claim 1, and
  (k) said kit including a rigid case
  (l) a rigid lid fitting over said case
  (m) said connector body being mounted on said case
  (n) said kit to man socket being mounted on said lid so as to fit into said body when said lid is closed.

10. In a disconnect device as defined in claim 1, and
  (k) said kit including a rigid case
  (l) a rigid lid fitting over said case
  (m) a shield on said case
  (n) said connector body being divided in at least two parts, one part being mounted in said shield
  (o) another part of said body containing said kit to man socket being mounted on said lid so as to operatively fit on the other part of said body when said lid is closed.

11. In a disconnect device as defined in claim 10, and
  (p) said shield extending beyond said body so as to shield the ship to kit plug inserted in said body.

12. In a disconnect device as defined in claim 1, and
  (k) said kit including a rigid case
  (l) a rigid lid fitting over said case
  (m) said connector body being divided in two spaced parts, one part containing said kit to man socket and the other part containing said ship to kit socket
  (n) said transmission means including connecting conduits for oxygen, air and electricity from one socket to the other.

13. In a disconnect device as defined in claim 1,
  (k) said actuated means including a push member movable in said body and engageable with said obstructing means to render the obstructing means inoperative (l) a pulling element movably held in said body (m) an actuating pull line to be pulled by said pulling element when said pulling element is moved outwardly from said body (n) actuating means on said ship to kit plug to actuate said push member when said ship to kit plug is inserted into said ship to kit socket (o) normally released locking means for interlocking said pulling element and said actuating means, said locking means being interlocked by engagement by said push member when said kit to man kit plug is inserted into said kit to man socket, whereby the withdrawal of said ship to kit plug from said ship to kit socket pulls said pulling element and said pull line.

14. In the disconnect device as defined in claim 13, (p) said push member projecting into the path of said obstructing means so as to be held in engagement with said locking means while both plugs are inserted in the respective sockets.

15. In the disconnect device as defined in claim 13, (p) said push member projecting into the path of said obstructing means so as to be held in engagement with said locking means while both plugs are inserted in the respective sockets (q) resiliently yieldable means normally to urge said push member out of engagement from said locking means.

16. In a disconnect device for detachable supply connections from aerial survival kit to the person wearing the kit and from ship supplies to the kit, (a) a connector body on the kit (b) a kit to man socket on said body (c) a ship to kit socket on said body (d) a kit to man connecting plug fitting said kit to man socket (e) a ship to kit connecting plug fitting said ship to kit socket (f) coacting dog and pocket on said kit to man plug and kit to man socket, said dog normally being in position to obstruct insertion of said kit to man plug into the kit to man socket but being movable into registering position with said pocket to enter said pocket and permit insertion of said kit to man plug (g) a push rod movable in said body and being engageable with said dog for moving said dog from obstructing position to registering position relatively to said pocket (h) a pushing member on said ship to kit plug to push said push rod for moving said dog into registering position when said ship to kit plug is inserted into said ship to kit socket.

17. The disconnect device defined in claim 16, and (i) a pulling element in said body at said ship to kit socket (j) a supply actuating pull line extended from said kit and being connected to said pulling element (k) normally released interlocking means between said pulling element and said ship to kit plug (l) means coacting with said push rod to operate said interlocking means when said kit to man plug is inserted in the kit to man socket.

18. The disconnect device defined in claim 17, and (m) resiliently yieldable means normally to urge said push rod out of engagement with said interlocking means.

19. The disconnect device defined in claim 17, and (m) resiliently yieldable means normally to urge said push rod out of engagement with said interlocking means, (n) said push rod being in operative relation to said kit to man plug in said kit to man socket thereby to be held by said kit to man plug in engagement with said interlocking means when both plugs are inserted in position.

References Cited

UNITED STATES PATENTS

| | | | |
|---|---|---|---|
| 3,038,472 | 6/1962 | Gaylord | 128—203 |
| 3,110,455 | 11/1963 | Oliveau | 244—1 |
| 3,185,148 | 5/1965 | Gaylord | 128—142 |

WILLIAM F. O'DEA, *Primary Examiner.*

R. GERARD, *Assistant Examiner.*